(12) United States Patent
Chern et al.

(10) Patent No.: US 11,078,601 B2
(45) Date of Patent: Aug. 3, 2021

(54) COMPOSITIONS AND METHODS FOR GEL SPINNING OF POLYAMIDES

(71) Applicant: AdvanSix Resins & Chemicals LLC, Parsippany, NJ (US)

(72) Inventors: Terry Chern, Colonial Heights, VA (US); Nathan Heldenbrand, Chester, VA (US); Yue Hu, Glen Allen, VA (US); John A. Young, Midlothian, VA (US); David J. Loy, Richmond, VA (US); James A. Kweeder, Chesterfield, VA (US)

(73) Assignee: AdvanSix Resins & Chemicals LLC, Parsippany, NJ (US)

(*) Notice: Subject to any disclaimer, the term of this patent is extended or adjusted under 35 U.S.C. 154(b) by 0 days.

(21) Appl. No.: 16/490,847

(22) PCT Filed: Feb. 13, 2018

(86) PCT No.: PCT/US2018/017959
§ 371 (c)(1),
(2) Date: Sep. 3, 2019

(87) PCT Pub. No.: WO2018/164814
PCT Pub. Date: Sep. 13, 2018

(65) Prior Publication Data
US 2019/0382921 A1 Dec. 19, 2019

Related U.S. Application Data

(60) Provisional application No. 62/469,038, filed on Mar. 9, 2017.

(51) Int. Cl.
| | | |
|---|---|---|
| *D01D 5/06* | (2006.01) | |
| *C08G 69/14* | (2006.01) | |
| *C08J 3/09* | (2006.01) | |
| *C08J 3/11* | (2006.01) | |
| *D01D 1/02* | (2006.01) | |
| *D01F 1/02* | (2006.01) | |
| *D01F 6/60* | (2006.01) | |

(52) U.S. Cl.
CPC .............. *D01D 5/06* (2013.01); *C08G 69/14* (2013.01); *C08J 3/096* (2013.01); *C08J 3/11* (2013.01); *D01D 1/02* (2013.01); *D01F 1/02* (2013.01); *D01F 6/60* (2013.01)

(58) Field of Classification Search
CPC .... D01D 5/06; D01D 1/02; D01F 1/02; D01F 6/60; C08J 3/096; C08J 3/11; C08G 69/14
USPC ......................................................... 524/98
See application file for complete search history.

(56) References Cited

U.S. PATENT DOCUMENTS

| | | | |
|---|---|---|---|
| 4,658,004 A | 4/1987 | Kobashi et al. | |
| 5,082,611 A | 1/1992 | Adams et al. | |
| 5,286,435 A * | 2/1994 | Slutsker .................... | D01F 6/06 264/178 F |
| 5,654,094 A | 8/1997 | Patel et al. | |
| 7,258,048 B2 | 8/2007 | Rastegar et al. | |
| 7,666,499 B2 | 2/2010 | Jung et al. | |
| 7,736,561 B2 | 6/2010 | Tam et al. | |
| 7,790,789 B2 * | 9/2010 | Kweeder ................... | D01F 6/60 524/98 |
| 8,106,116 B2 | 1/2012 | Kweeder | |
| 8,747,715 B2 | 6/2014 | Tam et al. | |
| 8,747,723 B2 | 6/2014 | Marshall et al. | |
| 9,238,879 B2 | 1/2016 | Moon et al. | |
| 2004/0154986 A1 * | 8/2004 | Cheng ....................... | D01F 6/32 210/650 |
| 2007/0210482 A1 * | 9/2007 | Jung ......................... | D01F 6/60 264/178 F |

FOREIGN PATENT DOCUMENTS

| | | |
|---|---|---|
| GB | 1057434 A | 2/1967 |
| GB | 1298314 A | 11/1972 |
| GB | 1367034 A | 9/1974 |
| JP | 63219622 A * | 9/1988 |
| JP | S63219622 A | 9/1988 |
| JP | 02033316 A * | 3/1990 |
| JP | H0233316 A | 3/1990 |
| JP | 2099607 A | 4/1990 |
| JP | H03140340 A | 6/1991 |
| KR | 100930204 B1 | 12/2009 |
| WO | 2005049694 A1 | 6/2005 |

OTHER PUBLICATIONS

Cho, J. W. et al. (1996). Mechanical Properties of Nylon 6 Fibers Gel-Spun from Benzyl Alcohol Solution. Journal of Applied Polymer Science, 62:771-778.
Gupta, V.B., & Kothari, V.K. (Eds.). (1997). Manufactured Fibre Technology. Springer Science+Business Media Dordrecht.
International Preliminary Report on Patentability issued in PCT/US2018/017959, dated Sep. 19, 2019, 8 pages.

(Continued)

*Primary Examiner* — Hui H Chin
(74) *Attorney, Agent, or Firm* — Faegre Drinker Biddle & Reath LLP

(57) ABSTRACT

A composition for forming a fiber includes at least one polyamide and caprolactam. The at least one polyamide has a number average molecular weight between 38,000 Da and 100,000 Da. The polyamide is at least partially dissolved in the caprolactam. The caprolactam comprises between 20 wt. % and 90 wt. % of the composition.

12 Claims, 5 Drawing Sheets

(56) References Cited

OTHER PUBLICATIONS

International Search Report and Written Opinion issued in PCT/US2018/017959, dated Apr. 13, 2018, 10 pages.
Schaller, R. et al. (2015). High-Performance Polyethylene Fibers "Al Dente": Improved Gel-Spinning of Ultrahigh Molecular Weight Polyethylene Using Vegetable Oils. Macromolecules, 48:8877-8884.
Smoak, J. et al. (1990). A Semiempiric Model for Establishing the Drawability of Solution-Spun Linear Polyamides and Other Flexible Chain Polymers. Journal of Applied Polymer Science, 41:105-116.

* cited by examiner

US 11,078,601 B2

COMPOSITIONS AND METHODS FOR GEL SPINNING OF POLYAMIDES

CROSS-REFERENCE TO RELATED APPLICATION

This application is a 371 National Stage application of International Application No. PCT/US2018/017959, filed Feb. 13, 2018, which claims priority to Provisional Application No. 62/469,038, filed Mar. 9, 2017, both of which is herein incorporated by reference in their entireties.

FIELD

The present invention relates to polyamide materials, and in particular, to gel spinning techniques for producing fibers from polyamides.

BACKGROUND

Typical polyamide, or nylon, textiles are produced using melt spinning techniques, in which the polyamide resin is heated to a melt state prior to extruding the resin through a spinneret to form the textile fiber. Such nylon resins typically have a molecular weight in the range of about 14,000 Dalton (Da) to 20,000 Da, and produce fibers having a tenacity of about 6-10 grams/denier. This mechanical strength is not sufficient for some high-performance textile fiber applications.

Some pre-fiber gel compositions, methods of manufacture, and uses thereof are disclosed, for example, in U.S. Pat. Nos. 7,258,048, 8,106,116, and International Patent Publication WO 2005/049694, the disclosures of which are hereby incorporated by reference in their entireties.

Improvements in the foregoing pre-fiber gel compositions and methods of manufacture are desired in order to produce mechanically stronger polyamide textile fibers suitable for a broader range of textile applications.

SUMMARY

The present disclosure provides a composition for gel spinning of polyamide fibers. The spun fibers may be useful in producing high-performance textiles.

Various embodiments concern a composition for forming a fiber. The composition includes at least one polyamide and caprolactam. The at least one polyamide has a number average molecular weight between 38,000 Da and 100,000 Da derived from formic acid viscosity (FAV) as determined according to ASTM 789. The polyamide is at least partially dissolved in the caprolactam. The caprolactam comprises between 20 wt. % and 90 wt. % of the composition. In some embodiments, the at least one polyamide of the composition is polyamide-6. In some embodiments, the caprolactam comprises between 50 wt. % and 90 wt. % of the total weight of the composition. In some embodiments, the polyamide has a number average molecular weight between 41,000 Da and 68,000 Da derived from formic acid viscosity (FAV) as determined according to ASTM 789.

Various embodiments include a method of producing a fiber. The method includes dissolving at least one polyamide into caprolactam to form a spinnable solution and spinning the spinnable solution by extruding the spinnable solution through a spinneret to form the fiber. The at least one polyamide has a number average molecular weight between 38,000 Da and 100,000 Da derived from formic acid viscosity (FAV) as determined according to ASTM 789. In some embodiments, dissolving the at least one polyamide is performed at a temperature of 150° C. to 270° C. In further embodiments, dissolving the at least one polyamide is performed at a temperature of 150° C. to 200° C. In some embodiments, the at least one polyamide is polyamide-6. In some embodiments, the spinnable solution includes between 20 wt. % and 90 wt. % caprolactam. In further embodiments, the spinnable solution includes between 50 wt. % to 90 wt. % caprolactam. In some embodiments, the polyamide has a number average molecular weight between 41,000 Da and 68,000 Da derived from formic acid viscosity (FAV) as determined according to ASTM 789. In some embodiments, the method further includes quenching the spun fibers in a quench bath containing a quenching liquid. In some embodiments, an air gap is defined between the spinneret and the quenching liquid in the quench bath, the air gap from 0.25 inches to 11 inches in length. In some embodiments, the air gap is from 0.5 inches to 2 inches in length. In some embodiments, quenching the spun fibers includes pulling the fiber through the quenching bath in a first direction and flowing the quenching liquid in a second direction. The second direction being substantially opposite to the first direction. In some embodiments, the quenching liquid has a dynamic viscosity of between 1,000 and 26,000 centipoise. In some embodiments, the quenching liquid is at a temperature from 50° C. to 150° C.

Various embodiments include a polyamide fiber. The polyamide fiber includes a plurality of polyamide polymer chains. The polyamide polymer chains have a number average molecular weight between 38,000 Da and 100,000 Da derived from formic acid viscosity (FAV) as determined according to ASTM 789. In some embodiments, a tenacity of the polyamide fiber is greater than 10 grams/denier.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION

Figure 1:
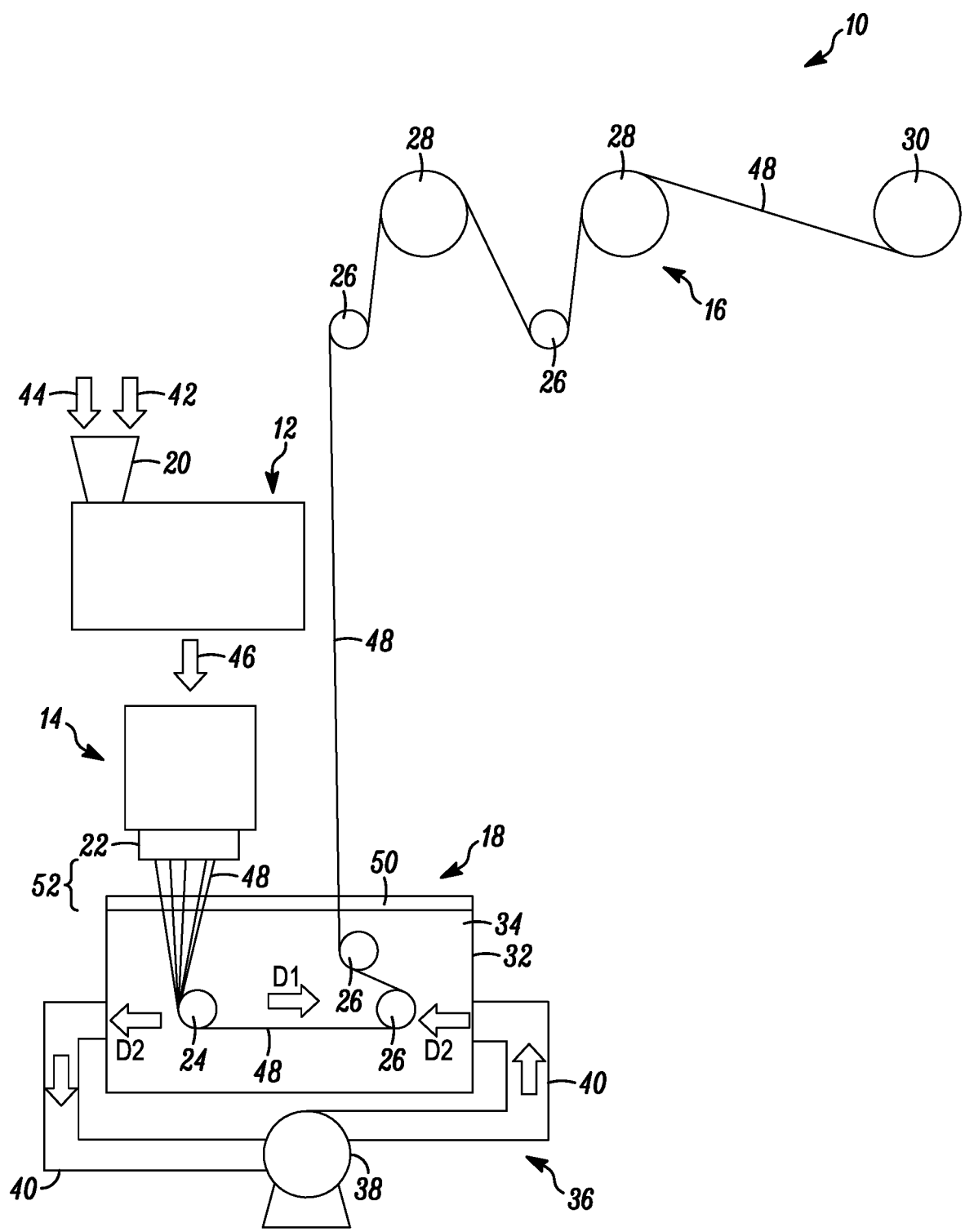
FIG. 1 is a schematic illustration of a system for producing a fiber, according to embodiments of the disclosure.

Embodiments of the disclosure can employ high molecular weight polyamide to form stronger polyamide fibers. For the purposes of this disclosure, high molecular weight polyamide has a number average molecular weight ($M_n$) greater than about 38,000 Da. As noted above, the molecular weight of the polyamides used in melt spinning has in the past been generally limited to no more than about 20,000 Da. Higher molecular weight polyamide may be too viscous to process through typical industrial extruders unless the extrusion temperature is increased, though a significant increase of the extrusion temperature may thermally degrade the polyamide.

However, it has now been found that high molecular weight polyamide can be partially dissolved in a gelling agent to form a spinnable solution in the form of a gel. The spinnable solution or gel can be extruded to form a polyamide fiber, as described below. It has been found that the strength of the polyamide fiber increases as the number average molecular weight of the polyamide used in the gel increases. Without wishing to be bound by any theory, it is believed that the greater strength of such polyamide fibers may be the result of fewer chain end defects.

In some embodiments, the polyamide fiber produced according to the present disclosure can have a tenacity greater than 10 grams/denier (gpd). In some embodiments, the polyamide fiber can have a tenacity as low as 10.5 gpd, 11 gpd, or 12 gpd, or as high as 14 gpd, 15 gpd, or 16 gpd, or within any range between any two of the foregoing values, such as 10.5 gpd to 16 gpd, 11 gpd to 15 gpd, or 12 gpd to 14 gpd, for example.

The polyamide may be provided in the form of a resin. In some embodiments, the polyamide includes at least one of polyamide-6 (PA-6), polyamide-6,6 (PA-6,6), and polyamide-9,6 (PA-9,6). In one embodiment the polyamide is polyamide-6 or polyamide-6,6. In a more particular embodiment, the polyamide is polyamide-6.

The polyamide can have a number average molecular weight greater than about 38,000 Da. In some embodiments, the polyamide can have a number average molecular weight as low as 38,000 Da, 41,000 Da, 46,000 Da, or 53,000 Da, or as high as 68,000 Da, 77,000 Da, 88,000 Da, or 100,000 Da, or within any range defined between any two of the forgoing values, for example, in some embodiments, the polyamide can have an number average molecular weight ranging from 38,000 Da to 100,000 Da, 41,000 Da to 88,000 Da, 46,000 Da to 77,000 Da, and 53,000 Da to 68,000 Da. In some embodiments, the polyamide can have a number average molecular weight of about 60,000 Da.

The molecular weight is typically related to the viscosity of the resin. Viscosity can be reported as the formic acid viscosity (FAV). The FAV is the viscosity of a 10 vol. % solution in 90 vol. % formic acid according to ASTM 789. The number average molecular weight ($M_n$) can be estimated from a measured FAV according to the relationship:

$$M_n = 4791.8 \times (\log(FAV))^{2.4056}.$$ 
Equation 1:

Accordingly, an FAV of 205 corresponds to a $M_n$ of about 36,000, an FAV of 230 corresponds to a $M_n$ of about 38,000, an FAV of 280 corresponds to a $M_n$ of about 41,000, an FAV of 365 corresponds to a $M_n$ of about 46,000, an FAV of 520 corresponds to a $M_n$ of about 53,000, an FAV of 725 corresponds to a $M_n$ of about 60,000, an FAV of 1,030 corresponds to a $M_n$ of about 68,000, an FAV of 1,500 corresponds to a $M_n$ of about 77,000, an FAV of 2,260 corresponds to a $M_n$ of about 88,000, and an FAV of 3,440 corresponds to a $M_n$ of about 100,000.

In this connection, the polyamide may have an FAV as little as 205, 230, 280, 365, or 520, or as great as 725, 1,030, or 1,500, 2,260 or 3,440, or may have an FAV within any range defined between any pair of the foregoing values, such as 205 to 3,440, 230 to 2,260, 280 to 1,500, 365 to 1,030, or 520 to 725, for example.

In one exemplary embodiment, the polyamide has an extractable content according to ISO 6427 as low as 0.2 wt. %, 0.5 wt. %, or 1 wt. %, or as high as 2 wt. %, 5 wt. %, or 10 wt. %, or an extractable content within any range defined between any two of the foregoing values, such as 0.2 wt. % to 10 wt. %, 0.2 wt. % to 2 wt. %, or 0.2 wt. % to 1 wt. %, for example. The extractable content can include, for example, caprolactam and various oligomers.

The gelling agent is capable of at least partially dissolving the polyamide to form a viscous solution or gel which is capable of being spun. Typical gelling agents have relatively low molecular weights, and may be monomers or oligomers. In some embodiments, the gelling agents include lactams. In some embodiments, the lactams can include caprolactam, caprolactam-based amides such as N-methyl caprolactam and N-ethyl caprolactam, and caprolactam-based amide-esters such as:

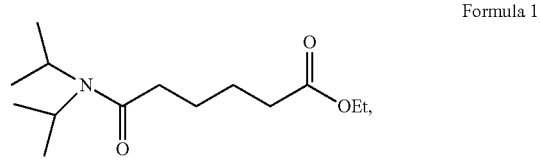
Formula 1

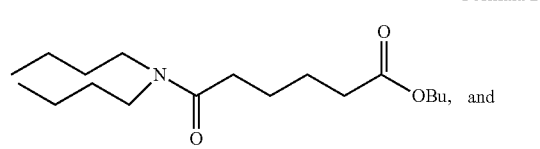
Formula 2

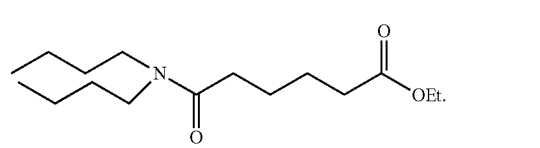
Formula 3

Caprolactam illustratively provides advantages as a gelling agent of the polyamide. In some embodiments, these advantages include one or more of: partial solvation of the polyamide to form the spinnable solution of a viscous solution or gel, low toxicity, relatively low cost, low odor, and relatively easy extraction from a spun fiber using water as a solvent.

The spinnable solution can be formed from the polyamide and range of concentrations of the gelling agent, such as caprolactam. In some embodiments, the spinnable solution has a caprolactam concentration as low as 20 wt. %, 30 wt. %, 40 wt. %, or 50 wt. %, or as high as 60 wt. %, 70 wt. %, 80 wt. %, or 90 wt. %, or within any range defined between any two of the foregoing values, for example, in some embodiments, the caprolactam concentration of the spinnable solution can range from 20 wt. % to 90 wt. %, 30 wt. % to 80 wt. %, 40 wt. % to 70 wt. %, 50 wt. % to 90 wt. %, 50 wt. % to 80 wt. %, 50 wt. % to 70 wt. %, or 50 wt. % to 60 wt. %. All caprolactam concentrations are based on the total weight of the spinnable solution.

In some embodiments, the spinnable solution has a polyamide concentration as low as 10 wt. %, 20 wt. %, 30 wt. %, or 40 wt. %, or as high as 50 wt. %, 60 wt. %, 70 wt. %, or 80 wt. %, or within any range defined between any two of the foregoing values, for example, in some embodiments, the polyamide concentration of the spinnable solution can range from 10 wt. % to 80 wt. %, 20 wt. % to 70 wt. %, 30 wt. % to 60 wt. %, or 40 wt. % to 50 wt. %. All polyamide concentrations are based on the total weight of the spinnable solution.

In some embodiments, the spinnable solution may further include one or more additives, such as a heat stabilizer, an anti-oxidant, a colorant, or a processing aid. In some embodiments, the total concentration of all additives does not exceed 5 wt. % of the total weight of the spinnable solution.

Higher number average molecular weight polyamides require generally higher concentrations of caprolactam to produce a spinnable solution that is not too viscous to process through typical industrial extruders. It has also been found that higher concentrations of caprolactam in the spinnable solution can produce stronger fibers. Without wishing to be bound by any theory, it is believed that the higher caprolactam concentrations, or loadings, help to reduce the entanglement density of the polymer chains of the polyamide (i.e., increase the molecular weight between entanglements ($M_e$)), which can improve the drawing ability, or drawability, of the fibers and the longitudinal orientation of the polymer chains to produce stronger fibers. See, e.g., R. Schaller et al., "High-Performance Polyethylene Fibers 'Al Dente': Improved Gel-Spinning of Ultrahigh Molecular Weight Polyethylene Using Vegetable Oils," *Macromolecules*, 2015, 48 (24), pp 8877-8884.

FIG. 1 is a schematic illustration of a system for producing a fiber, according to embodiments of the disclosure. As shown in FIG. 1, the system 10 can include a mixer 12, a spin block 14, a fiber drawing apparatus 16, and, optionally, a quench system 18. The mixer 12 can include a feed port 20. The mixer 12 can include, for example, mechanical stirrers, twin-screw extruders, and Brabender mixers. The spin block 14 can include a spinneret 22. Spinneret 22 is a die including a plurality of holes (not shown). The fiber drawing apparatus 16 can include a change of direction device 24, a plurality of rollers 26, one or more draw rollers 28, and a final roller, or winder 30. In some embodiments, the change of direction device 24 is a rotating roller. In other embodiments, the change of direction device 24 is a non-rotating bar. The rollers 26 are rotating rollers. In some embodiments, the draw rollers 28 and the winder 30 can be powered rollers. The quench system 18 can include a quench bath 32 and a quenching liquid 34. In some embodiments, the quenching liquid 34 can be contained in the quench bath 32. In some embodiments, the quenching liquid 34 can include water. In some embodiments, such as the embodiment shown in FIG. 1, the quench system 18 further includes an optional flow circulation system 36. The flow circulation system 36 can include a pump 38 and piping 40. The piping 40 is connected on either side of the pump 38 and to the quench bath 32 to circulate the quenching liquid 34 through the quench bath 32.

Figure 2:
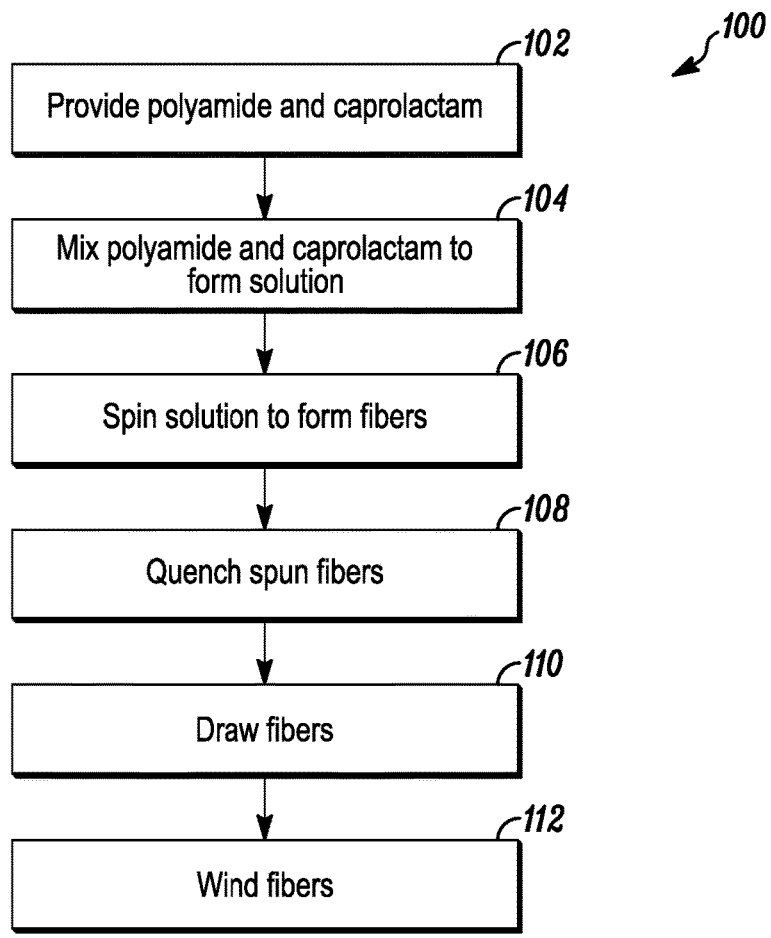
FIG. 2 is a flow diagram illustrating a method for producing a fiber, according to embodiments of the disclosure.

FIG. 2 is a flow diagram illustrating a method 100 for producing a fiber, according to embodiments of the disclosure. Considering FIGS. 1 and 2 together, in block 102, a polyamide 42 and a gelling agent 44 according to any of the embodiments described above are provided according to any of the weight percentages described above and fed into the feed port 20. Referring to block 104, the polyamide 42 and the gelling agent 44 are mixed in the mixer 12 to dissolve the polyamide 42 in the gelling agent 44 to form a spinnable solution 46 according to any of the embodiments describe above. In some embodiments, the polyamide 42 and gelling agent 44 may be heated in the mixer 12 to assist in forming the spinnable solution 46.

In some embodiments, the spinnable solution 46 is formed at a temperature as low as 150° C., 160° C., 170° C., 175° C., 180° C., 185° C., or 190° C., or as high as 200° C., 225° C., 250° C., 255° C., 260° C., 270° C., or 275° C., or within any range defined between any two of the foregoing values, such as 150° C. to 200° C., 170° C. to 190° C., 175° C. to 185° C., 250° C. to 270° C., or 255° C. to 265° C., for example.

Referring to block 106, the spinnable solution 46 is provided to the spin block 14 where it is spun by extrusion through the holes of the spinneret 22 to form a plurality of fibers 48. The speed of the fibers 48 exiting the spinneret 22 is referred to as a gel speed. In some embodiments, the gel speed may be as low as 0.4 meters/minute (m/min.), 0.8 m/min., 1 m/min., or 3 m/min., as high as 10 m/min., 14 m/min., 20 m/min., or 30 m/min., or within any range defined between any two of the foregoing values, such as 0.4 m/min. to 30 m/min., 0.8 m/min. to 20 m/min, or 3 m/min. to 14 m/min.

In some embodiments, the spin block 14 may heat the spinnable solution 46 during spinning. In some embodiments, the spinnable solution 46 is spun at a temperature as low as 150° C., 160° C., 180° C., or 200° C., or as high as 220° C., 240° C., 260° C., 265° C., or 270° C., or within any range defined between any two of the foregoing values, such as 150° C. to 270° C., 180° C. to 265° C., or 200° C. to 265° C., for example.

As noted above, higher number average molecular weight polyamides 42 require generally higher concentrations of the gelling agent 44, such as caprolactam, to produce the spinnable solution 46 that is not too viscous to process through typical industrial extruders. Also, higher concentrations of caprolactam in the spinnable solution 46 can produce stronger fibers.

However, in some embodiments, the high caprolactam loading can result in the fibers 48 having a low melt strength as extruded from the spinneret 22. Fibers having too low a melt strength may break while being pulled into fiber form during subsequent drawing processes. Thus, in block 108, the fibers 48 are provided to the quench system 18. As shown in FIG. 1, the fibers 48 are pulled into and through the quenching liquid 34. The quenching liquid 34 can be maintained at a temperature below the spinning temperature to quickly increase the melt strength of the fibers 48.

In some embodiments, the quenching liquid 34 is maintained at a temperature as low as 2° C., 4° C., 8° C., 15° C., 25° C. or 40° C., or as high as 50° C., 75° C., 100° C., 120° C., or 150° C., or within any range defined between any two of the foregoing values, such as 2° C. to 150° C., 4° C. to 120° C., 8° C. to 100° C., 15° C. to 75° C., 25° C. to 50° C., 40° C. to 50° C., 50° C. to 75° C., or 25° C. to 75° C., for example. In some embodiments, the quenching liquid 34 is maintained at a temperature greater than a glass transition temperature of the fibers 48, for example, 50° C. to 150° C. Without wishing to be bound by any theory, it is believed that a higher temperature of the quenching liquid 34 delays polymer crystallization and that delaying crystallization provides for more successful spinning of polyamide having a number average molecular weight greater than about 38,000 Da.

A distance between the spinneret 22 and a surface 50 of the quenching liquid 34 in the quench bath 32 defines an air gap 52, as shown in FIG. 1. The air gap 52 can be as small as 0.25 inches, 0.5 inches, 0.75 inches, 1 inch, 1.5 inches, 2 inches, or 2.5 inches, or as large as 3 inches, 4 inches, 5 inches, 6 inches, 7 inches, 9 inches, or 11 inches, or within any range between any two of the foregoing values, such as 0.25 inches to 11 inches, or 0.25 inches to 2.5 inches, or 0.25 inches to 2 inches, for example. Without wishing to be bound by any theory, it is believed that a generally smaller air gap 52 can support the spinning of the spinnable solution 46 having a generally higher concentration of caprolactam by more quickly cooling the fibers 48 upon exiting the spinneret 22.

Referring to block 110, after quenching has begun, the fibers 48 are provided to the fiber drawing apparatus 16 to draw the fibers 48. As shown in FIG. 1, the fibers 48 are pulled into and through the quenching liquid 34 and over the change of direction device 24. In some embodiments, a ratio of a speed of the fibers 48 leaving the change of direction device 24 to the gel speed can be as low as 1.0:1, 1.15:1, or 2.0:1, or as high as 100:1, 500:1, or 1000:1, or within any range defined between any two of the foregoing values, such as 1.0:1 to 1000:1, 1.5:1 to 500:1, or 2.0:1 to 100:1, for example.

As the fibers 48 are subsequently pulled over the plurality of rollers 26 by the draw rollers 28, the speed of the fibers 48 can increase, further drawing the fibers 48. For example, in some embodiments, the ratio of the speed of the fibers 48 leaving the quenching liquid 34 to the gel speed can be as low as 15:1, 30:1, 50:1, 70:1, or 100:1, or as high as 160:1, 200:1, 250:1, 300:1, or 350:1, or within any range defined by any two of the foregoing values, such as 15:1 to 350:1, 30:1 to 300:1, 50:1 to 250:1, 70:1 to 200:1, or 100:1 to 160:1, for example. The ratio of the speed of the fibers 48 leaving the quenching liquid 34 to the gel speed is the spinning draw ratio.

In some embodiments, the speed of the fibers 48 leaving the quenching liquid 34 can be as low as 200 meters per minute (mpm), 300 mpm, 400 mpm, 500 mpm, 600 mpm, 700 mpm, or 800 mpm, or as high as 1,000 mpm, 1,100 mpm, 1,200 mpm, 1,300 mpm, 1,400 mpm, 1,500 mpm, or 1,600 mpm, or can be within any range defined by any two forgoing values, such as 200 mpm to 1,600 mpm, 300 mpm to 1,500 mpm, 400 mpm to 1,400 mpm, 500 mpm to 1,300 mpm, 600 mpm to 1,200 mpm, 700 mpm to 1,100 mpm, and 800 mpm to 1,000 mpm, for example. The speed of the fibers 48 leaving the quenching liquid 34 is called the take-up speed (T.U. Speed).

As shown in FIG. 1, the fibers 48 can be pulled through the quench bath 32 in a first direction D1. In some embodiments in which the quench system 18 further includes the flow circulation system 36, the flow circulation system 36 can be configured to circulate the quenching liquid 34 through the quench bath 32 in a second direction D2. As shown in FIG. 1, the second direction D2 is substantially opposite to the first direction D1. The flow of the quenching liquid 34 counter to the draw direction of the fibers 48 will tend to produce an increase in the drag between the fibers 48 and the quenching liquid 34. In some embodiments, the quenching liquid 34 can flow along an axis parallel to an axis defined by the length or extent of the fibers 48 and flow in a direction generally opposite to a direction of movement of the fibers 48. Without wishing to be bound by any theories, it is believed that the increased drag may further improve the longitudinal orientation of the polymer chains to produce stronger fibers. It is further believed that by increasing the drag on the fibers 48, the crystallinity and alpha crystal phase formation of the polyamide may be increased, resulting in a higher strength fiber.

Alternatively, or in addition to, the flow circulation system 36, drag on the fibers 48 can be increased by increasing the dynamic viscosity of the quenching liquid 34. In some embodiments, the dynamic viscosity of the quenching liquid 34 can be as low as 1,000 centipoise (cp), 5,000 cp, 10,000 cp, 12,000 cp, or 14,000 cp, or as high as 18,000 cp, 20,000 cp, 22,000 cp, 24,000 cp, or 26,000 cp, or within any range defined between any two of the foregoing values, such as 1,000 cp to 26,000 cp, 5,000 cp to 24,000 cp, 10,000 cp to 22,000 cp, 12,000 cp to 20,000 cp, 14,000 cp to 18,000 cp, or 18,000 cp to 24,000 cp, for example.

In some embodiments, the desired level of dynamic viscosity of the quenching liquid 34 can be obtained by lowering the temperature of the quenching liquid 34 or by adding thickening agents to the quenching liquid 34. For example, in some embodiments, the quenching liquid 34 is maintained at a temperature as low as 2° C., 4° C., 6° C., or 8° C., or as high as 10° C., 12° C., 14° C., or 16° C., or within any range defined between any two of the foregoing values, such as 2° C. to 16° C., 4° C. to 14° C., 6° C. to 12° C., or 8° C. to 10° C., for example. In some embodiments, the quenching liquid 34 is maintained at a temperature of about 4.4° C. Additionally or alternatively, in some embodiments, the quenching liquid 34 can further include a thickening agent, such as corn starch or polymeric acrylic acid ester.

In block 112, the fibers 48 are wound on the winder 30. In some embodiments, the ratio of the speed of the fibers 48 as they are wound on the winder 30 to the gel speed can be as low as 1.0:1, 1.5:1, or 2.0:1, or as high as 200:1, 1000:1, or 3000:1, or within any range defined between any two of the foregoing values, such as 1.0:1 to 200:1, 1.5:1 to 1000:1, or 2.0:1 to 3000:1, for example.

In some embodiments in which the quenching liquid 34 consists essentially of water, the quenching liquid 34 can extract a significant portion of the caprolactam from the fibers 48, possibly reducing the extent to which the higher caprolactam concentration is able to reduce the entanglement density of the polymer chains of the polyamide and improve longitudinal orientation of the polymer chains to produce stronger fibers. Thus, in some other embodiments, the quenching liquid 34 can include caprolactam in addition to water. The concentration of caprolactam in the quenching liquid 34 can be maintained as desired to prevent extraction of the caprolactam from the fibers 48, or to controllably reduce the extent to which the caprolactam is extracted from the fibers 48 during quenching. In some embodiments, the quenching liquid 34 can have a caprolactam concentration as low as 10 wt. %, 20 wt. %, 30 wt. %, 40 wt. %, or as high as 60 wt. %, 70 wt. %, 80 wt. %, or 90 wt. %, or within any range defined between any two of the foregoing values, such as 10 wt. % to 90 wt. %, 30 wt. % to 70 wt. %, or 40 wt. % to 60 wt. %, for example.

In some embodiments, the fibers 48 have a strength according to ASTM D2256 as low as 8 grams per denier (gpd), 9 gpd, 10, gpd, or 12 gpd, or as high as 14 gpd, 16 gpd, 18 gpd, or 20 gpd, or within any range defined between any two of the foregoing values, such as 8 gpd to 20 gpd, 9 gpd to 18 gpd, 10 gpd to 16 gpd, or 12 gpd to 14 gpd, for example.

In some embodiments, the fibers 48 have an ultimate elongation UE (%) according to ASTM D2256 as little as 1%, 2,%, or 5% or as great as 10%, 20%, or 50%, or within any range defined between any two of the foregoing values, such as 1% to 50%, 2% to 50%, or 1% to 20%, for example.

Figure 3:
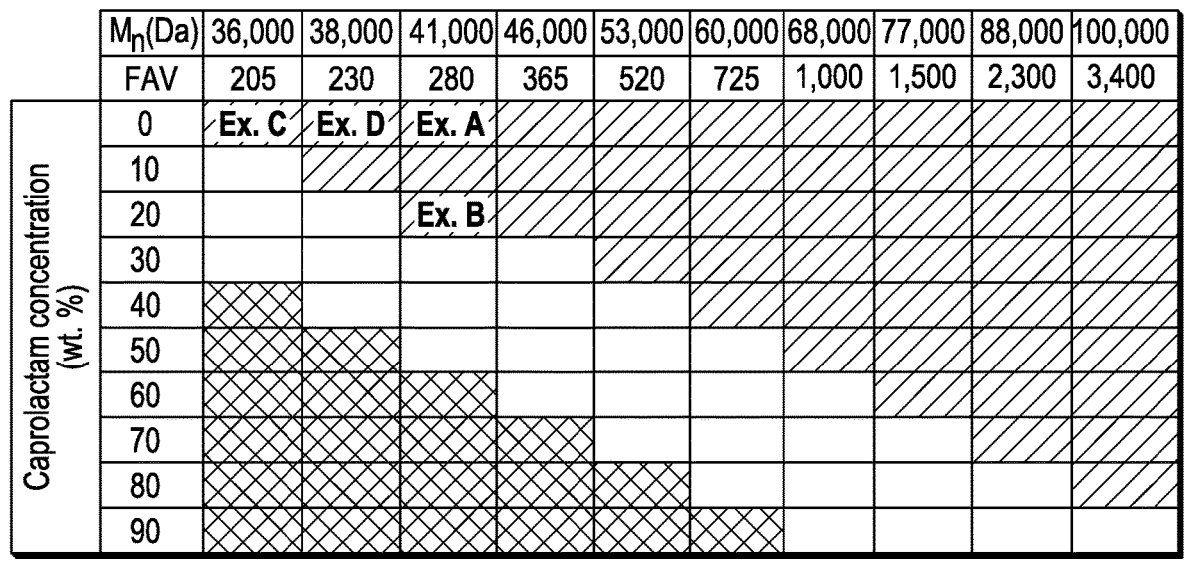
FIG. 3 is a chart illustrating a spinnability of various combinations of polyamides and caprolactam, including actual and expected spinnabilities in accordance with embodiments of the disclosure.

FIG. 3 illustrates the expected spinnability of solutions of various number average molecular weight polyamides mixed with various percentages of caprolactam. Without wishing to be bound by any theories, it is believed that for a polyamide of a given number average molecular weight, too low a caprolactam concentration in the solution may require an extrusion pressure that is too high for the extruder to spin the fibers (lightly shaded regions). Conversely, if the caprolactam concentration in the solution is too high, the melt strength may be too low to spin the fibers (darkly shaded regions). As shown in FIG. 3, increasing the number average molecular weight of the polyamide requires an increasing weight percentage of caprolactam in the composition for the solution to be spinnable (unshaded regions).

As used herein, the phrase "within any range defined between any two of the foregoing values" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

While the present disclosure is primarily directed to applications such as textile spinning, it should be understood that the features disclosed herein may have application to other spinning and extrusion processes, including carpet fiber spinning, conventional spinning, and gel spinning such as used for ultra-high molecular weight polyethylene used in high performance fiber applications.

While this invention has been described as relative to exemplary designs, the present invention may be further modified within the spirit and scope of this disclosure. Further, this application is intended to cover such departures from the present disclosure as come within known or customary practice in the art to which this invention pertains.

EXAMPLES

Example 1—Polyamide PA-6 and Caprolactam Solutions

Compositions of varying amounts of PA-6 and caprolactam were formed by dissolving the PA-6 into the caprolactam at an elevated temperature to form a viscous solution or gel. The compositions were then fed to an extruder including a spinneret including a plurality of outlet holes to spin the composition into fibers.

For Comparative Example A, a composition of 100% PA-6 having a formic acid viscosity of 280 (0% caprolactam) was fed to a spinneret having a 72 filament count, each of a 0.4 mm diameter. Fibers were unable to be formed as the pack pressure exceeded the 3000 psi operating limit of the system at a throughput of 10-11 pounds per hour. Comparative Example A is shown in the lightly shaded region of FIG. 3 (Ex. A).

For Example B, a composition of 20% caprolactam and 80% PA-6 having a formic acid viscosity of 280 was formed by dissolving the PA-6 into the caprolactam at a temperature in the range of 255° C. to 265° C., and then provided to the same spinneret as Comparative Example A. Fibers were successfully spun at a throughput of 12 pounds per hour. Comparative Example B is shown in the unshaded region of FIG. 3 (Ex. B).

Example 2—Polyamide Fiber Tenacity

FIGS. 4-7 illustrate the effect of polyamide molecular weight, quenching liquid temperature, spinning draw ratio, take-up speed, and the air gap between the spinneret the surface of the quenching liquid in the quench bath on the tenacity of the polyamide fibers. In each case, the PA-6 was prepared as for Example A described above. That is, the PA-6 was not dissolved by caprolactam. The quenching liquid was water.

Figure 4:
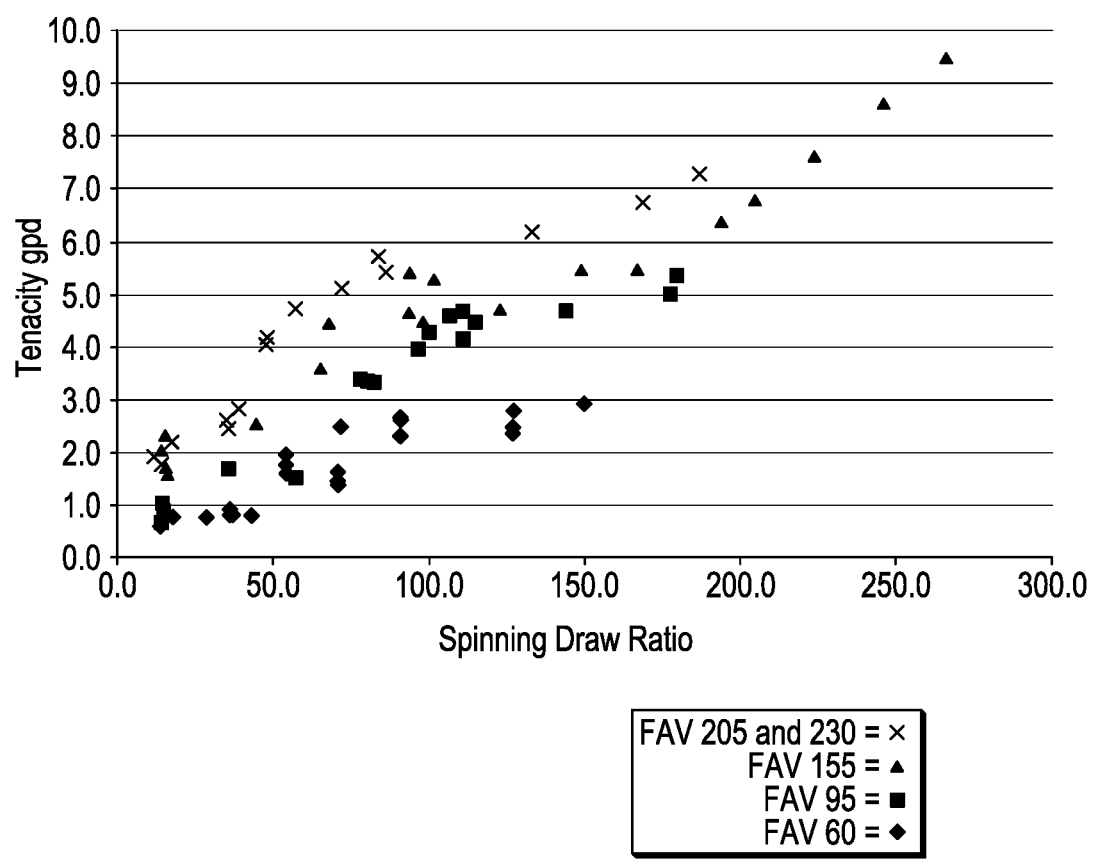
FIGS. 4-7 are charts illustrating the effect of polyamide molecular weight, quenching liquid temperature, spinning draw ratio, take-up speed, and an air gap on the tenacity of polyamide fibers.

FIG. 4 is a chart showing the effect of spinning draw ratio on tenacity for polyamide fibers produced from PA-6 of various molecular weights. For FIGS. 4-7, molecular weights are indicated by FAV. As shown in FIG. 4, the tenacity of the fibers increases with increasing spinning draw ratio, with higher molecular weight polyamides generally more able to be drawn at higher ratios. Also, for a given spinning draw ratio, higher molecular weight polyamides generally produced fibers with higher tenacity.

Figure 5:
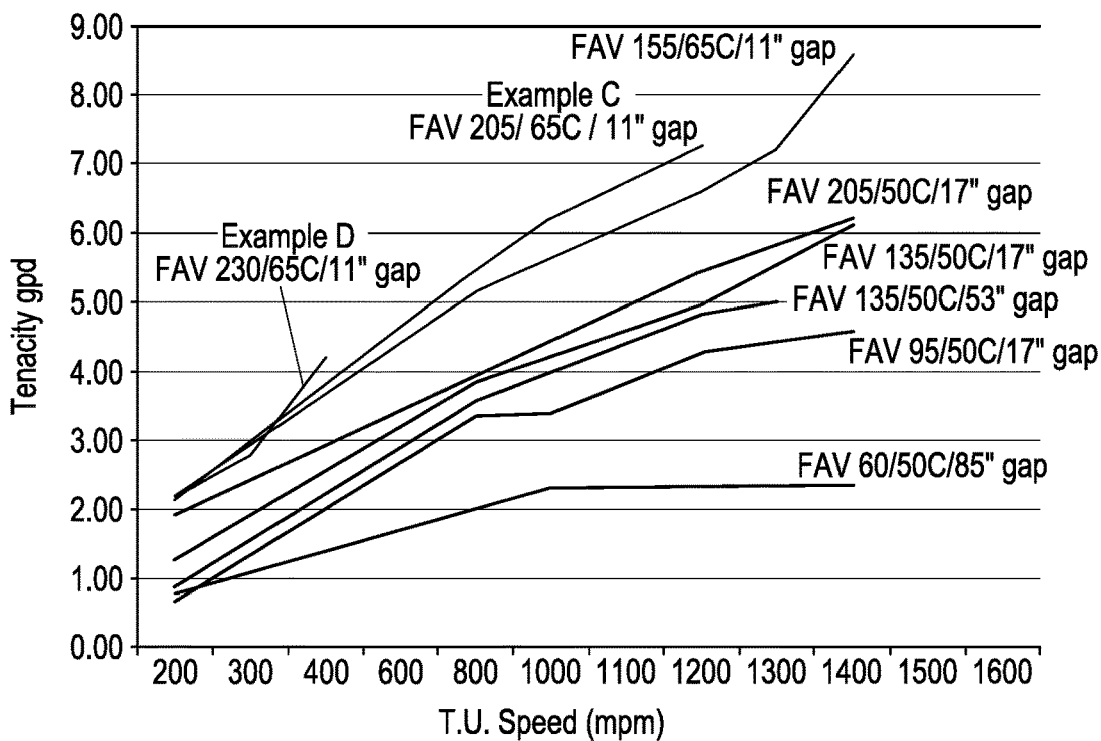

FIG. 5 is a chart showing the effect of take-up speed on tenacity for a polyamide fibers produced from PA-6 of various molecular weights using quenching liquids of various temperatures at various air gaps. For each line, the molecular weight in FAV, quenching liquid temperature in degrees Celsius, and the air gap in inches is shown by the line. As shown in FIG. 5, tenacity generally increases with increasing take-up speed. This aligns with the data shown in FIG. 4, since take-up speed and spinning draw ratio are related for a constant gel speed. FIG. 5 also shows the increase in tenacity with increasing polyamide molecular weight of the polyamides used to make the polyamide fibers, as in FIG. 4. As further shown in FIG. 5, decreasing the air gap also generally increases the tenacity of the fibers. FIG. 5 also shows that increasing the temperature of the quenching liquid generally increases the tenacity of the fibers.

In FIG. 5, the line showing the strength of polyamide fibers formed from polyamide having an FAV of 205, in a quenching liquid at 65° C. at an air gap of 11 inches is Example C. The line showing the strength of polyamide fibers formed from polyamide having an FAV of 230, in a quenching liquid at 65° C. at an air gap of 11 inches is Example D. Example C shows relatively high tenacity up to a take-up speed of about 1,200 mpm, while Example D shows somewhat higher tenacity at a low take-up speed of about 400 mpm, but is not able to be drawn at higher speeds. Example C is shown on the unshaded portion of FIG. 3, while Example D is shown in the lightly shaded portion of FIG. 3.

Figure 6:
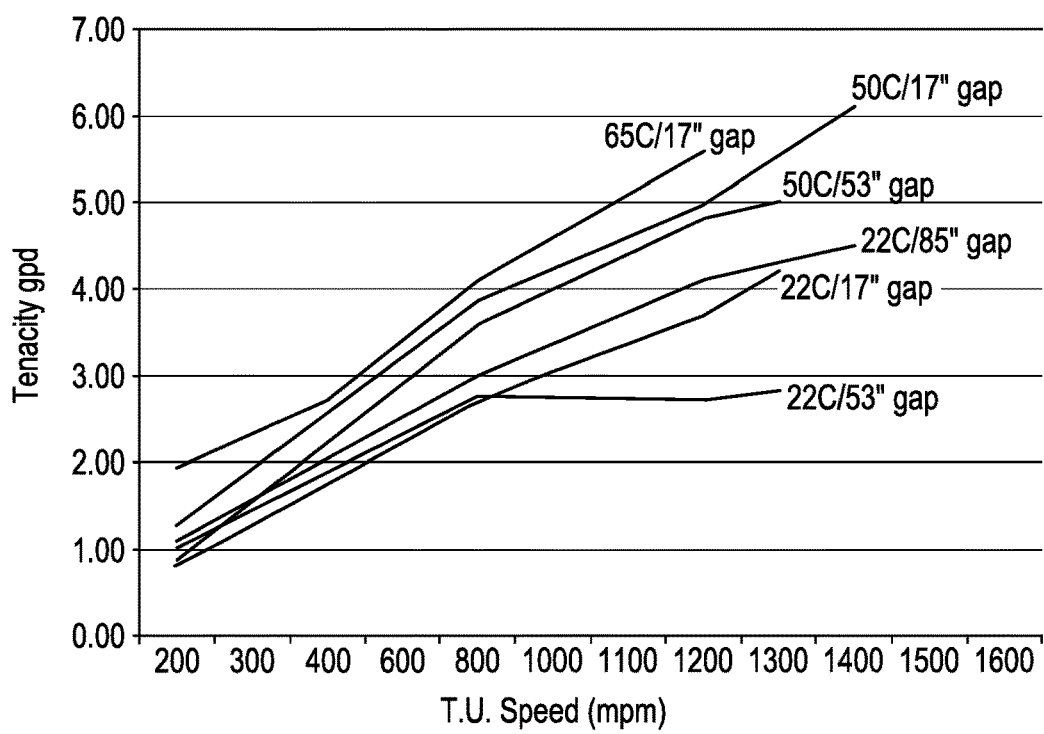

FIG. 6 is a chart showing the effect of take-up speed on tenacity for a polyamide fibers produced from PA-6 having a molecular weight of about 32,000 (FAV—155) using quenching liquids of various temperatures at various air gaps. For each line, the quenching liquid temperature in degrees Celsius and the air gap in inches is shown by the line. As shown in FIG. 6, tenacity generally increases with increasing take-up speed, increasing quenching liquid temperature, and decreasing air gap, at least at higher quenching liquid temperatures.

Figure 7:
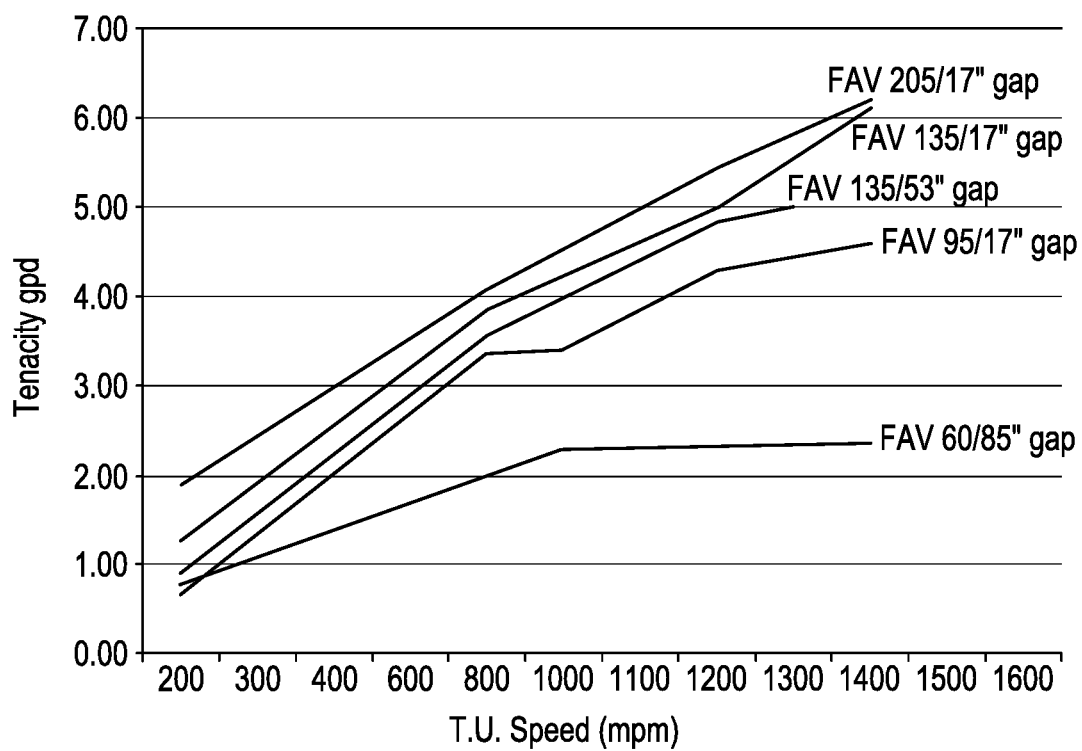

FIG. 7 is a chart showing the effect of take-up speed on tenacity for a polyamide fibers produced from PA-6 of various molecular weights at various air gaps. The quenching liquid temperature is 50° C. For each line, the molecular weight in FAV and the air gap in inches is shown by the line. As shown in FIG. 7, tenacity generally increases with increasing take-up speed, increasing molecular weight, and decreasing air gap (compare FAV 135 lines).

The invention claimed is:
1. A composition for forming a fiber, the composition comprising:
 at least one polyamide having a number average molecular weight between 38,000 Da and 88,000 Da, derived from formic acid viscosity (FAV) as determined according to ASTM D789 according to the relationship: $M_n = 4791.8 \times (\log(\text{FAV}))^{2.4056}$ ; and
 caprolactam, wherein the polyamide is at least partially dissolved in the caprolactam, the caprolactam comprising between 30 wt. % and 90 wt. % of the composition.

2. The composition of claim 1, wherein the caprolactam comprises between 50 wt. % and 90 wt. % of the composition.

3. The composition of claim 1, wherein the polyamide has a number average molecular weight between 41,000 Da and 68,000 Da, derived from formic acid viscosity (FAV) as determined according to ASTM D789.

4. A method of producing a fiber, the method comprising:
dissolving at least one polyamide having a number average molecular weight between 38,000 Da and 88,000 Da, derived from formic acid viscosity (FAV) as determined according to ASTM D789 according to the relationship:
$M_n=4791.8\times(\log(FAV))^{2.4056}$, into caprolactam to form a spinnable solution; and
spinning the spinnable solution by extruding the spinnable solution through a spinneret to form the fiber, wherein the spinnable solution includes between 30 wt. % and 90 wt. % caprolactam.

5. The method of claim 4, wherein dissolving the at least one polyamide is performed at a temperature of 150° C. to 270° C.

6. The method of claim 4, wherein the spinnable solution includes between 50 wt. % and 90 wt. % caprolactam.

7. The method of claim 4, wherein the polyamide has a number average molecular weight between 41,000 Da and 68,000 Da, derived from formic acid viscosity (FAV) as determined according to ASTM D789.

8. The method of claim 4, further comprising quenching the spun fibers in a quench bath containing a quenching liquid.

9. The method of claim 8, wherein an air gap is defined between the spinneret and the quenching liquid in the quench bath, the air gap from 0.25 inches to 11 inches in length.

10. The method of claim 8, wherein quenching the spun fibers includes:
pulling the fiber through the quenching bath in a first direction; and
flowing the quenching liquid in a second direction, the second direction being opposite to the first direction.

11. The method of claim 8, wherein the quenching liquid has a dynamic viscosity of between 1,000 centipoise and 26,000 centipoise.

12. The method of claim 8, wherein the quenching liquid is at a temperature from 50° C. to 150° C.

* * * * *